US009906730B2

(12) United States Patent
Hashiguchi

(10) Patent No.: US 9,906,730 B2
(45) Date of Patent: Feb. 27, 2018

(54) MOTION CONTROLLER DEVICE

(71) Applicant: Nihon Video System Co., Ltd., Tsushima-shi, Aichi (JP)

(72) Inventor: Kentaro Hashiguchi, Tushima (JP)

(73) Assignee: Nihon Video System Co., Ltd., Tsushima-Shi, Aichi (JP)

( * ) Notice: Subject to any disclaimer, the term of this patent is extended or adjusted under 35 U.S.C. 154(b) by 0 days.

(21) Appl. No.: 14/942,591

(22) Filed: Nov. 16, 2015

(65) Prior Publication Data
US 2016/0173755 A1    Jun. 16, 2016

(30) Foreign Application Priority Data

Nov. 18, 2014  (JP) ................. 2014-233544
Jun. 3, 2015   (JP) ................. 2015-113366

(51) Int. Cl.
*H04N 5/225*   (2006.01)
*H04N 5/232*   (2006.01)
(Continued)

(52) U.S. Cl.
CPC ......... *H04N 5/23296* (2013.01); *H04N 5/222* (2013.01); *H04N 5/2259* (2013.01);
(Continued)

(58) Field of Classification Search
CPC .................................. H04N 5/23206
See application file for complete search history.

(56) References Cited

U.S. PATENT DOCUMENTS 4,612,045 A    9/1986   Shintaku
6,161,933 A *  12/2000  Tschida .............. G03B 3/12
                                             348/211.2
(Continued)

FOREIGN PATENT DOCUMENTS

JP    61-0368311 A    4/1986
JP    61-098311 A     5/1986
(Continued)

OTHER PUBLICATIONS

Office Action dated Sep. 1, 2015, issued in corresponding Japanese Application No. 2015-113366, filed Jun. 3, 2015, 13 pages.
(Continued)

*Primary Examiner* — Twyler L Haskins
*Assistant Examiner* — Dwight Alex C Tejano
(74) *Attorney, Agent, or Firm* — Christensen O'Connor Johnson Kindness PLLC

(57) ABSTRACT

Provided is a motion controller device that allows users to easily share focus, zoom, and iris position control operations.

A motion controller device includes a master unit and one or more slave units separated from the master unit and configured to communicate with the master unit. The master unit includes a focus control signal output unit configured to output a control signal for controlling a focus position of a lens of a video camera, a zoom control signal output unit configured to output a control signal for controlling a zoom position of the lens, and an iris control signal output unit configured to output a control signal for controlling an his position of the lens. A selection can be made as to whether an output from at least one of the focus control signal output unit, the zoom control signal output unit, and the iris control signal output unit is controlled by the master unit or the one or more slave units.

9 Claims, 2 Drawing Sheets

(51) Int. Cl.
*H04N 5/222* (2006.01)
*H04N 5/238* (2006.01)

(52) U.S. Cl.
CPC ......... *H04N 5/238* (2013.01); *H04N 5/23203* (2013.01); *H04N 5/23212* (2013.01)

(56) References Cited

U.S. PATENT DOCUMENTS

| | | | | |
|---|---|---|---|---|
| 6,526,232 | B1* | 2/2003 | Mizumura | H04N 5/232 348/211.99 |
| 2006/0165405 | A1* | 7/2006 | Kanai | H04N 5/23203 396/334 |
| 2007/0109418 | A1* | 5/2007 | Idemura | H04N 5/23203 348/211.99 |
| 2008/0036871 | A1* | 2/2008 | Ohmura | H04N 1/00127 348/222.1 |
| 2011/0025861 | A1* | 2/2011 | Dumm | F16M 11/10 348/207.11 |
| 2011/0050925 | A1* | 3/2011 | Watanabe | H04N 5/23203 348/211.2 |
| 2012/0044373 | A1* | 2/2012 | Shiozaki | G03B 35/08 348/218.1 |
| 2014/0354780 | A1* | 12/2014 | Matsuura | G03B 35/08 348/47 |

FOREIGN PATENT DOCUMENTS

| | | |
|---|---|---|
| JP | 09-098330 A | 4/1997 |
| JP | 2001-125162 A | 5/2001 |
| JP | 2007-322759 A | 12/2007 |
| JP | 2009-015001 A | 1/2009 |
| JP | 2013-207772 A | 3/2012 |
| JP | 2014-082594 A | 5/2014 |
| JP | 2014-186096 A | 10/2014 |
| WO | WO 2013146288 A1 * 10/2013 ............. G03B 35/08 |

OTHER PUBLICATIONS

Office Action dated Jan. 19, 2016, issued in corresponding Japanese Application No. 2015-225331, 10 pages.

* cited by examiner

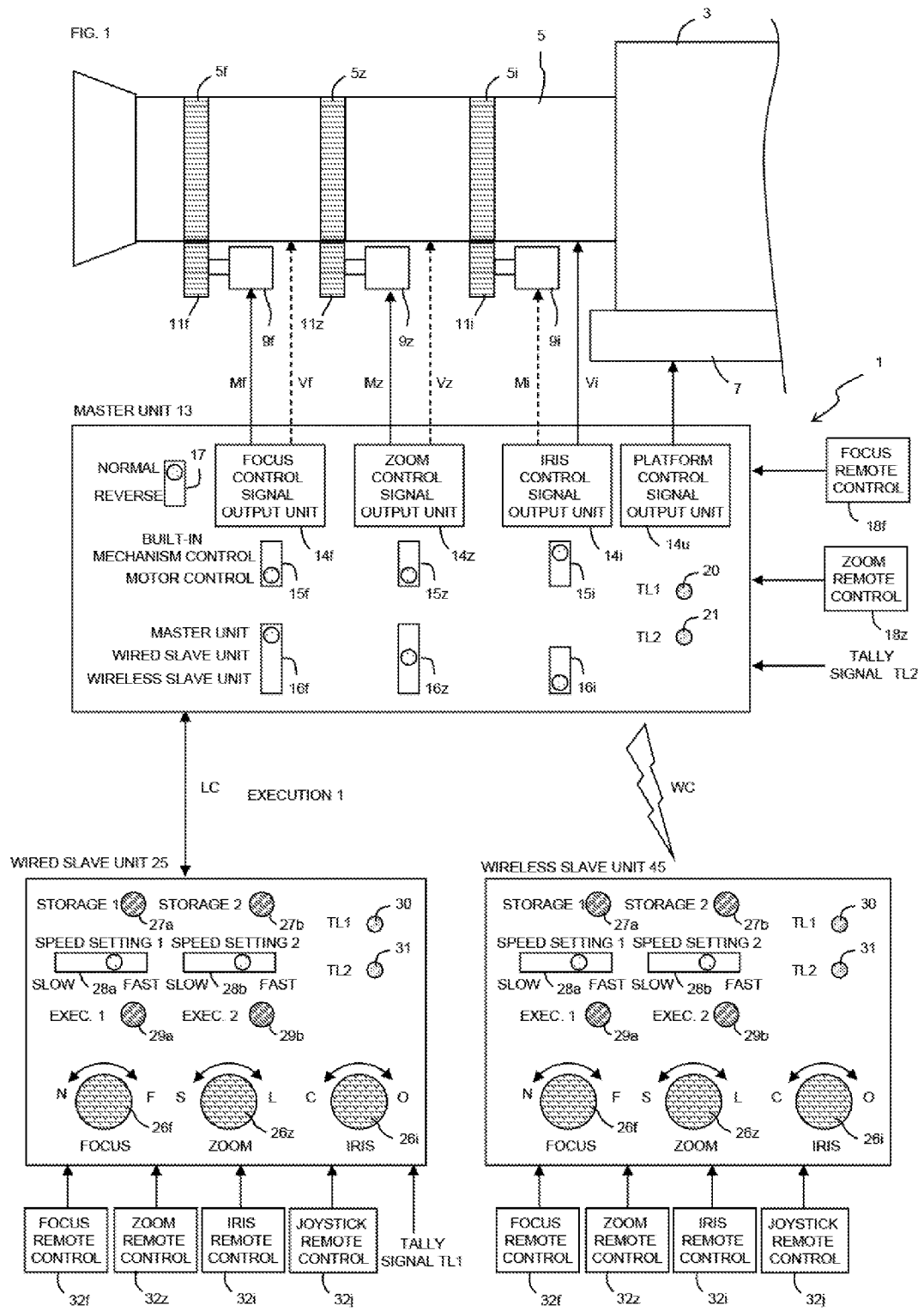

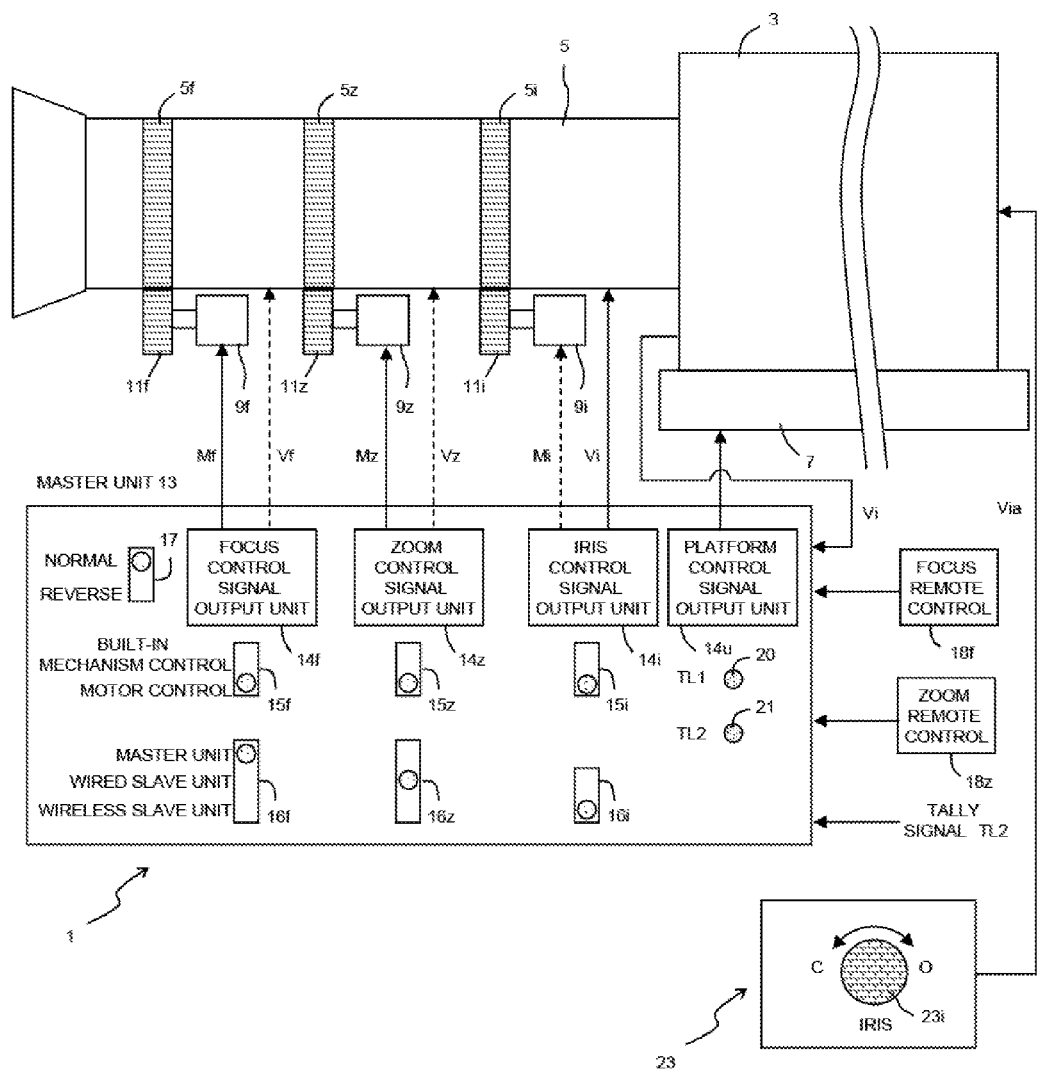

MOTION CONTROLLER DEVICE

TECHNICAL FIELD

The present invention relates to a motion controller device that can control the focus, zoom, and ins positions of a lens of a video camera.

BACKGROUND ART

Typically, images for a film are captured using a 2K, 4K, or 8K video camera for broadcast. Making a film having a higher degree of completion requires zoomed-in images, or various techniques for enhancing the sense of realism of the site, such as rack focus. When a director makes a high level of request to a cameraperson, the cameraperson has to satisfy the request by repeatedly capture images and precisely controlling rack focus, zoom speed, or iris-controlled image brightness.

SUMMARY OF INVENTION

It is very difficult for a single cameraperson to exactly control all of the focus, zoom, and iris positions. For this reason, in capturing images for a film, different persons may share the focus, zoom, and iris position adjustment operations, and there is a desire for a method for allowing different persons to easily share the operations.

The present invention has been made in view of the foregoing, and an object thereof is to provide is a motion controller device that allows different persons to easily share focus, zoom, and iris position control operations.

The present invention provides a motion controller device including a master unit and one or more slave units separated from the master unit and configured to communicate with the master unit. The master unit includes a focus control signal output unit configured to output a control signal for controlling a focus position of a lens of a video camera, a zoom control signal output unit configured to output a control signal for controlling a zoom position of the lens, and an iris control signal output unit configured to output a control signal for controlling an iris position of the lens. The motion controller device is configured in such a manner that a selection can be made as to whether an output from at least one of the focus control signal output unit, the zoom control signal output unit, and the iris control signal output unit is controlled by the master unit or the one or more slave units.

In the present invention, the motion controller device includes the master unit and one or more slave units, and a selection can be made as to whether the focus, zoom, and iris positions are controlled by the master unit or the one or more slave units. According to this configuration, for example, settings can be made such that the focus position is controlled by the master unit; the zoom position is controlled by a first slave unit; and the iris position is controlled by a second slave unit. Thus, different persons can easily share the operations in such a manner that the different persons operate the master unit and the first and second slave units.

Various embodiments of the present invention are described below. The embodiments below can be combined with each other.

Preferably, the control signals include at least one of a built-in motor-driven mechanism control signal and a motor control signal, the built-in motor-driven mechanism control signal controlling the focus position or the zoom position using a built-in motor-driven mechanism, the motor control signal controlling the focus position or the zoom position by rotating a focus ring or a zoom ring in accordance with rotation of an external motor, the focus ring and zoom ring controlling the focus position and the zoom position, respectively.

Preferably, the motion controller device is configured in such a manner that a selection can be made as whether the control signals outputted by the focus control signal output unit and the zoom control signal output unit are each the built-in motor-driven mechanism control signal or the motor control signal.

Preferably, the control signals are each a motor control signal for controlling the focus position or the zoom position by rotating a focus ring or a zoom ring in accordance with rotation of an external motor, the focus ring and the zoom ring controlling the focus position and the zoom position, respectively. Preferably, the motion controller device is configured in such a manner that a rotation direction of the motor can be selected.

Preferably, the device includes a storage unit configured to, when a predetermined operation is performed, store a position state including at least one of the then focus position, the then zoom position, and the then iris position and a reproduction unit configured to reproduce the position state.

Preferably, the motion controller device is configured in such a manner that a speed at which the reproduction unit reproduces the position state can be set.

Preferably, the master unit and the one or more slave units each include a tally signal receiving unit configured to receive a tally signal. Preferably, the motion controller device is configured in such a manner that lighting of a tally lamp disposed on the one or more slave units is controlled on the basis of the tally signal received by the master unit. Preferably, lighting of a tally lamp disposed on the master unit is controlled on the basis of the tally signal received by the one or more slave units.

Preferably, the master unit and the one or more slave units are each configured in such a manner that a remote control for controlling at least one of the focus position, the zoom position, and the iris position can be connected thereto.

Preferably, the master unit includes a platform control signal output unit configured to output a control signal for controlling a motor-driven platform on which the video camera is placed.

Preferably, the motion controller device is configured in such a manner that an output from the platform control signal output unit is controlled by operating a joystick remote control connected to the master unit or the one or more slave units. Preferably, by operating a selection switch disposed on the master unit, a selection can be made as to whether an output from at least one of the focus control signal output unit, the zoom control signal output unit, and the iris control signal output unit is controlled by the master unit or the one or more slave units.

Preferably, by operating a first selection switch disposed on the master unit, a selection can be made as to whether an output from the focus control signal output unit is controlled by the master unit or the one or more slave units. Preferably, by operating a second selection switch disposed on the master unit, the motion controller device is configured in such a manner that a selection can be made as to whether an output from the zoom control signal output unit is controlled by the master unit or the one or more slave units.

Preferably, the one or more slave units include a first control volume for controlling the focus position and a second control volume for controlling the zoom position.

Preferably, the master unit is configured in such a manner that a focus remote control for controlling the focus position and a zoom remote control for controlling the zoom position can be connected thereto. Preferably, the one or more slave units are separated from the focus remote control and the zoom remote control.

Another aspect of the present invention provides a motion controller device including a focus control signal output unit configured to output a control signal for controlling a focus position of a lens of a video camera and a zoom control signal output unit configured to output a control signal for controlling a zoom position of the lens. The control signals are each a built-in motor-driven mechanism control signal or a motor control signal, the built-in motor-driven mechanism control signal controlling the focus position or the zoom position using a built-in motor-driven mechanism, the motor control signal controlling the focus position or the zoom position by rotating a focus ring or a zoom ring in accordance with rotation of an external motor, the focus ring and the zoom ring controlling the focus position and the zoom position, respectively. The motion controller device is configured in such a manner that selections can be made as to whether the control signals outputted by the focus control signal output unit and the zoom control signal output unit are each the built-in mechanism control signal or the motor control signal.

In this aspect, the motion controller device need not necessarily include a master unit or a slave unit. According to the configuration of this aspect, even when a lens is used which is not provided with a built-in motor-driven mechanism for controlling the focus and zoom positions, the focus and zoom positions can be motor-driven controlled externally.

Yet another aspect of the present invention provides a master unit including a focus control signal output unit configured to output a control signal for controlling a focus position of a lens of a video camera, a zoom control signal output unit configured to output a control signal for controlling a zoom position of the lens, and an iris control signal output unit configured to output a control signal for controlling an iris position of the lens, a storage unit configured to, when a predetermined operation is performed, store a position state including at least one of the then focus position, the then zoom position, and the then iris position, and a reproduction unit configured to reproduce the position state. The motion controller device is configured in such a manner that a speed at which the reproduction unit reproduces the position state can be set.

In this aspect, the motion controller device need not necessarily include a master unit or a slave unit. According to the configuration of this aspect, the speed at which the position state is moved from one position state to another can be set to any speed. For example, the zoom position can be moved to a particular position slowly or quickly. Thus, impressive images can be easily generated. Further, a particular focus position can be stored. Thus, by previously controlling and storing the focus position during a rehearsal, a really captured image can be prevented from falling out of focus.

Still yet another aspect of the present invention provides a motion controller device including a control signal output unit configured to output a motor control signal for controlling a position state including at least one of a focus position, a zoom position, and an iris position of a lens of a video camera by rotating a position control ring in accordance with rotation of an external motor, the position control ring controlling the position state. The motion controller device is configured to receive a built-in motor-driven mechanism control signal fear controlling the position state of the lens provided with a built-in motor-driven mechanism, and the control signal output unit is configured to output the motor control signal corresponding to the built-in motor-driven mechanism control signal.

In this aspect, the motion controller device need not necessarily include a master unit or a slave unit. According to the configuration of this aspect, even when a lens is used which is not provided with a built-in motor-driven mechanism, the lens can be motor-driven controlled using a camera control unit (CCU).

BRIEF DESCRIPTION OF THE DRAWINGS

FIG. 1 shows an example configuration of a system that controls the focus, zoom, and iris positions of a lens of a video camera using a motion controller device of a first embodiment of the present invention; and FIG. 2 shows an example configuration of a system that controls the focus, zoom, and iris positions of a lens of a video camera using a motion controller device and a CCU of a second embodiment of the present invention.

DESCRIPTION OF EMBODIMENTS

Now, embodiments of the present invention will be described with reference to the drawings. Various features described in the embodiments below can be combined with each other.

1. First Embodiment

FIG. 1 shows an example configuration of a system that controls the focus, zoom, and iris positions of a lens 5 of a video camera 3 using a motion controller device 1 of a first embodiment of the present invention. The motion controller device 1 includes a master unit 13, a wired slave unit 25, and a wireless slave unit 45. The master unit 13 and wired slave unit 25 communicate with each other bi-directionally through wire communication LC, and the master unit 13 and wireless slave unit 45 communicate with each other bi-directionally through wireless communication WC. While, in the present embodiment, the wired slave unit 25 and wireless slave unit 45 have the same configuration except for the elements relating to wired or wireless communication, they may have different configurations. One of the wired slave unit 25 and wireless slave unit 45 may be omitted. Two or more wired slave units 25 or two or more wireless slave units 45 may be provided.

The lens 5 is provided with a focus ring 5*f*, a zoom ring 5*z*, and an iris ring 5*i* (may be collectively referred to as the "position control ring"). By rotating these rings, the focus, zoom, and iris positions (may be collectively referred to as the "position state") of the lens 5 are changed. The lens 5 is also provided with a built-in motor-driven mechanism (not shown). The master unit 13 includes a focus control signal output unit 14*f*, a zoom control signal output unit 14*z*, and an iris control signal output unit 14*i*. The master unit 13 changes the focus, zoom, and iris positions of the lens 5 by causing the focus control signal output unit 14*f*, zoom control signal output unit 14*z*, and iris control signal output unit 14*i* to output built-in motor-driven mechanism control signals Vf, Vz, and Vi to the lens 5. Note that the focus, zoom, and iris positions of the lens 5 can also be changed manually.

Gears are formed on the perimeters of the focus ring 5*f*, zoom ring 5*z*, and iris ring 5*i*, and drive gears 11*f*, 11*z*, and 11*i* are disposed so as to engage with these gears. The drive gears 11*f*, 11*z*, and 11*i* are rotationally driven by external motors 9*f*, 9*z*, and 9*i*, respectively. The motors 9*f*, 9*z*, and 9*i* receive motor control signals Mf, Mz, and Mi from the control signal output units 14*f*, 14*z*, and 14*i* of the master unit 13 and thus the respective rotation positions are controlled. As seen above, the focus, ZOOM and iris positions of the lens 5 are controlled by the motor control signals Mf, Mz, and Mi. Note that the rotation directions of the motors 9*f*, 9*z*, and 9*i* may be changed by operating a switch 17 disposed on the master unit 13. The switch 17 may be configured to individually control the rotation directions of the motors 9*f*, 9*z*, and 9*i*. According to this configuration, the disposition orientations of the motors 9*f*, 9*z*, and 9*i* can be reversed. Further, the drive gears 11*f*, 11*z*, and 11*i* can be detached from the motors 9*f*, 9*z*, and 9*i*, respectively. Thus, drive gears 11*f*, 11*z*, and 11*i* suitable for the gear shapes of the perimeters of the rings 5*f*, 5*z*, and 5*i* can be selected and attached.

The master unit 13 is provided with switches 15*f*, 15*z*, and 15*i*. By operating the switches 15*f*, 15*z*, and 15*i*, selections can be made as to whether the control signal output units 14*f*, 14*z*, and 14*i* output, as controls signals, built-in mechanism controls signals Vf, Vz, and Vi or motor control signals Mf, Mz, and Mi. In the example shown in FIG. 1, the control signal output units 14*f*, 14*z*, and 14*i* output Mf, Mz, and Vi; thus the focus and zoom positions are controlled by the rotation of the motors 9*f* and 9*z*, and the iris position is controlled by the built-in motor-driven mechanism. According to this configuration, even when a lens 5 is used which is not provided with built-in motor-driven mechanisms for controlling the focus and zoom positions, the focus and zoom positions can be motor-driven controlled externally. Since almost ever lens is provided with a built-in motor-driven mechanism for controlling the iris position, the iris control signal output unit 14*i* may be configured to always output a built-in mechanism control signal Vi.

The master unit 13 is also provided with switches 16*f*, 16*z*, and 16*i*. By operating the switches 16*f*, 16*z*, and 16*i*, selections can be made as to whether respective outputs from the control signal output units 14*f*, 14*z*, and 14*i* are controlled by the master unit 13, wired slave unit 25, or wireless slave unit 45. In the example in FIG. 1, settings are made such that the output from the focus control signal output unit 14*f* is controlled by the master unit 13; the output from the zoom control signal output unit 14*z* is controlled by the wired slave unit 25; and the output from the iris control signal output unit 14*i* is controlled by the wireless slave unit 45. A configuration may be employed in which a selection can be made as to whether at least one of the outputs from the control signal output units 14*f*, 14*z*, and 14*i* is controlled by the master unit or any slave unit. For example, a configuration may be employed in which the output from the focus control signal output unit 14*f* is always controlled by the master unit 13; and selections can be made as to the outputs from the control signal output units 14*z* and 14*i* are controlled by the master unit 13, wired slave unit 25, or wireless slave unit 45.

The master unit 13 may be attached to the video camera 3 when capturing images and thus may give a shock to the video camera 3 when the master unit 13 is operated. To prevent this, the master unit 13 is not provided with means for controlling the focus, zoom, and iris positions but rather is configured in such a manner that a focus remote control 18*f* and a zoom remote control 18*z* can be connected thereto.

Thus, by using the focus remote control 18*f* and zoom remote control 18*z*, the master unit 13 is allowed to control the focus and zoom positions. Note that the master unit 13 itself may be provided with means for controlling the focus, zoom, and iris positions.

The wired slave unit 25 and wireless slave unit 45 are each provided with volumes 26*f*, 26*z*, and 26*i* for controlling the focus position (close to far), zoom position (small to large), and iris position (close to open), respectively. The focus, zoom, and iris positions can be controlled by operating (rotating) these control volumes. Further, the slave units 25 and 45 are each configured in such a manner that a focus remote control 32*f*, a zoom remote control 32*z*, and an iris remote control 32*i* can be connected thereto. Thus, each user can operate the slave unit using the remote control that he or she is accustomed to use.

The slave units 25 and 45 are also each provided with storage switch 27*a* and 27*b* for storing the position state including the focus, zoom, and iris positions, execution switches 29*a* and 29*b* for reproducing the stored position states, and speed control volumes 28*a* and 28*b* for setting the speed at which the position state is reproduced. The storage switches 27*a* and 27*b* have the same function; the execution switches 29*a* and 29*b* have the same function; and the speed control volumes 28*a* and 28*b* have the same function. Thus, in the present embodiment, two position states can be stored and reproduced. Note that the number of position states which can be stored and reproduced may be increased or reduced. The position state may include all of the focus, zoom, and iris positions, or may include only the focus and zoom positions, or may include only one of the focus and zoom positions.

When the storage switch 27*a* is pressed, the then position state A is stored in a storage unit. When the storage switch 27*b* is pressed after moving the focus, zoom, and iris positions, the then position state B is stored in the storage unit. When the execution switch 29*a* is pressed in this state, the focus, zoom, and iris positions are moved from the position state B to the position state A at the speed set using the speed control volume 28*a*. Subsequently, when the execution switch 29*b* is pressed, the focus, zoom, and iris positions are moved from the position state A to the position state B at the speed set using the speed control volume 28*b*. As seen above, in the present embodiment, the speed at which the position state is moved from one position state to another can be set to any speed. For example, the zoom position can be moved to a particular position slowly or quickly. Thus, impressive images can be easily generated. Further, a particular focus position can be previously stored. Thus, by previously controlling and storing the focus position during a rehearsal, a really captured image can be prevented from falling out of focus. Similarly, the zoom position or iris position stored during a rehearsal can be reproduced accurately. While the example in which the position state is moved between the position states A and B has been described above, the position state may be moved from another position state to the position state A or B. Note that the master unit 13 may also be provided with storage switches, execution switches, and speed control volumes.

The wired slave unit 25 receives a tally signal TL1, for example, from a video switcher (not shown). The lighting of a tally lamp 30 is controlled on the basis of the tally signal TL1. The tally signal TL1 received by the wired slave unit 25 is transmitted to the master unit 13 and wireless slave unit 45. The lighting of a tally lamp 20 of the master unit 13 and the lighting of a tally lamp 30 of the wireless slave unit 45 are controlled on the basis of the tally signal TL1. According to this configuration, the lighting or extinguishing of the tally lamp 20 of the master unit 13 and that of the tally lamps 30 of the slave units 25 and 45 can be matched.

The master unit 13 receives a tally signal TL2, for example, from the video camera 3. The lighting of a tally lamp 21 is controlled on the basis of the tally signal TL2. The tally signal TL2 received by the master unit 13 is transmitted to the slave units 25 and 45. The lighting of tally lamps 31 of the slave units 25 and 45 is controlled on the basis of the tally signal TL2. According to this configuration, the lighting or extinguishing of the tally lamp 21 of the master unit 13 and that of the tally lamps 31 of the slave units 25 and 45 can be matched.

The video camera 3 is placed on a motor-driven platform 7. The motor-driven platform 7 is placed on a tripod (not shown). When the motor-driven platform 7 receives a platform control signal from a platform control signal output unit 14$u$ of the master unit 13, it moves, for example, in the direction of the X-axis or Y-axis. The output from the platform control signal output unit 14$u$ is controlled, for example, by operating one of joystick remote controls 32$j$ connected to the slave units 25 and 45. A joystick remote control may be connected to the master unit 13.

While, in the present embodiment, the switches are slide switches, other types of switches, such as rotation type or button type, may be used. Similarly, while, in the present embodiment, the control volumes and speed control volumes are of rotation type and of slide type, respectively, other types of volumes may be used. These also apply to an embodiment below.

2. Second Embodiment

Referring now to FIG. 2, a second embodiment of the present invention will be described. Since the present embodiment is similar to the first embodiment, the differences therebetween will be mainly described.

In the present embodiment, a dedicated camera control unit (CCU) 23 is connected to a video camera 3. The CCU 23 includes an iris position control volume 23$i$. By operating the control volume 23$i$, a change is made to an iris position control CCU output signal Via. The changed CCU output signal Via is inputted to the video camera 3 and outputted therefrom as it is or after converted, as a built-in mechanism control signal Vi corresponding to the CCU output signal Via.

Typically, a lens 5 is provided with a built-in motor-driven mechanism for controlling the iris position, and when the built-in mechanism control signal Vi is inputted to the lens 5, the iris position is motor-driven controlled. However, if the lens 5 is a lens which is not provided with a built-in motor-driven mechanism, such as a PL mount lens, the built-in mechanism control signal Vi cannot be inputted thereto. Thus, disadvantageously, the iris of the lens cannot be motor-driven controlled using the CCU 23.

To solve this problem, in the present embodiment, a master unit 13 is configured to receive the built-in mechanism control signal Vi from the video camera 3, and an iris control signal output unit 14$i$ thereof is configured to output a motor control signal Mi corresponding to the built-in mechanism control signal Vi. The iris control signal output unit 14$i$ may output the motor control signal Mi corresponding to the built-in mechanism control signal Vi when it detects that the master unit 13 has received the built-in mechanism control signal Vi, or when the output of the motor control signal Mi corresponding to the built-in mechanism control signal Vi is selected by operating a predetermined switch.

According to this configuration, when a change is made to the CCU output signal Via by operating the control volume 23$i$ of the CCU 23, the video camera 3 outputs a changed built-in mechanism control signal Vi corresponding to the changed CCU output signal Via. The master unit 13 outputs a changed motor control signal Mi corresponding to the changed built-in mechanism control signal Vi. Thus, the iris position is controlled.

As seen above, according to the present embodiment, even when the lens 5 is not provided with a built-in motor-driven mechanism, the iris position of the lens 5 can be controlled using the dedicated CCU 23 connected to the video camera 3.

The present invention may be carried out in the following aspects.

While, in the second embodiment, the video camera 3 converts a CCU output signal Via into a built-in mechanism control signal Vi and outputs it, a separate converter may convert a CCU output signal Via into a built-in mechanism control signal Vi and output it. In this case, the built-in mechanism control signal Vi outputted from the converter is inputted to the master unit 13.

The CCU 23 may be provided with the volume 23$i$, as well as volumes for controlling the focus position and zoom position. In this case, the CCU 23 outputs output signals for controlling the focus position, zoom position, and iris position to the video camera 3. The video camera 3 outputs the CCU output signals as they are or after converting them, as built-in mechanism control signals Vf, Vz, and Vi. The master unit 13 receives the built-in mechanism controls signals Vf, Vz, and Vi from the video camera 3 and outputs motor control signals Mf, Ma, and Mi corresponding to the built-in mechanism controls signals Vf, Vz, and Vi. According to this configuration, even when the lens 5 is not provided with a built-in motor-driven mechanism, the focus, zoom, and iris positions of the lens 5 can be controlled using the dedicated CCU 23 connected to the video camera 3.

What is claimed is:

1. A motion controller device comprising:
    a master unit comprising:
        a focus control signal output unit configured to output a control signal for controlling a focus position of a lens of a video camera;
        a zoom control signal output unit configured to output a control signal for controlling a zoom position of the lens; and
        an iris control signal output unit configured to output a control signal for controlling an iris position of the lens; and
    one or more slave units separated from the master unit and configured to communicate with the master unit, wherein
    the motion controller device is configured in such a manner that a selection can be made as to whether an output from at least one of the focus control signal output unit, the zoom control signal output unit, and the iris control signal output unit is controlled by the master unit or the one or more slave units,
    wherein the control signals include at least one motor control signal, the motor control signal controlling the focus position or the zoom position by rotating a focus ring or a zoom ring in accordance with rotation of an external motor, the focus ring and zoom ring controlling the focus position and the zoom position, and wherein the control signals include a built-in motor-driven mechanism control signal, the built-in motor-driven mechanism control signal controlling the focus position or the zoom position using a built-in motor-driven mechanism.

2. The device of claim 1, wherein the motion controller device is configured in such a manner that a selection can be made as whether the control signals outputted by the focus control signal output unit and the zoom control signal output unit are each the built-in motor-driven mechanism control signal or the motor control signal.

3. The device of claim 1, wherein
the control signals are each a motor control signal for controlling the focus position or the zoom position by rotating a focus ring or a zoom ring in accordance with rotation of an external motor, the focus ring and the zoom ring controlling the focus position and the zoom position, respectively, and
the motion controller device is configured in such a manner that a rotation direction of the motor can be selected.

4. The device of claim 1, further comprising:
a storage unit configured to, when a predetermined operation is performed, store a position state including at least one of the then focus position, the then zoom position, and the then iris position; and
a reproduction unit configured to reproduce the position state.

5. The device of claim 4, wherein the motion controller device is configured in such a manner that a speed at which the reproduction unit reproduces the position state can be set.

6. The device of claim 1, wherein the master unit and the one or more slave units are each configured in such a manner that a remote control for controlling at least one of the focus position, the zoom position, and the iris position can be connected thereto.

7. The device of claim 1, wherein the master unit comprises a platform control signal output unit configured to output a control signal for controlling a motor-driven platform on which the video camera is placed.

8. The device of claim 7, wherein the motion controller device is configured in such a manner that an output from the platform control signal output unit is controlled by operating a joystick remote control connected to the master unit or the one or more slave units.

9. A motion controller device comprising:
a master unit comprising:
a focus control signal output unit configured to output a control signal for controlling a focus position of a lens of a video camera;
a zoom control signal output unit configured to output a control signal for controlling a zoom position of the lens; and
an iris control signal output unit configured to output a control signal for controlling an iris position of the lens; and
one or more slave units separated from the master unit and configured to communicate with the master unit, wherein
the motion controller device is configured in such a manner that a selection can be made as to whether an output from at least one of the focus control signal output unit, the zoom control signal output unit, and the iris control signal output unit is controlled by the master unit or the one or more slave units,
wherein the control signals include at least one motor control signal, the motor control signal controlling the focus position or the zoom position by rotating a focus ring or a zoom ring in accordance with rotation of an external motor, the focus ring and zoom ring controlling the focus position and the zoom position, and
wherein the master unit and the one or more slave units each comprise a tally signal receiving unit configured to receive a tally signal, and
the motion controller device is configured in such a manner that lighting of a tally lamp disposed on the one or more slave units is controlled on the basis of the tally signal received by the master unit, and lighting of a tally lamp disposed on the master unit is controlled on the basis of the tally signal received by the one or more slave units.

* * * * *

UNITED STATES PATENT AND TRADEMARK OFFICE
CERTIFICATE OF CORRECTION

PATENT NO. : 9,906,730 B2
APPLICATION NO. : 14/942591
DATED : February 27, 2018
INVENTOR(S) : K. Hashiguchi It is certified that error appears in the above-identified patent and that said Letters Patent is hereby corrected as shown below:

On the Title Page

| Column | Line | Error |
|---|---|---|
| (57) | Abstract | "controlling an his position" should read |
| Column 2 | 12-13 of text | --controlling an iris position-- |

Signed and Sealed this
Twenty-first Day of August, 2018

Andrei Iancu
*Director of the United States Patent and Trademark Office*